No. 807,701. PATENTED DEC. 19, 1905.
C. H. VADER.
ADJUSTABLE CHAIR SEAT.
APPLICATION FILED APR. 10, 1905.
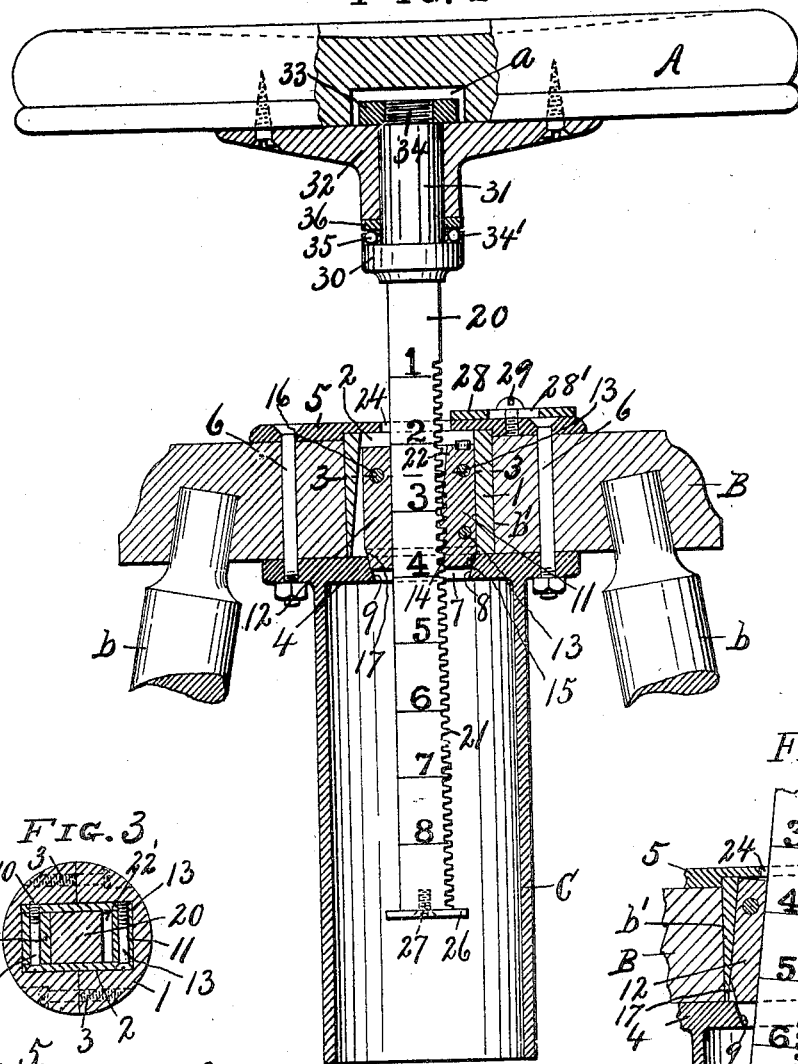
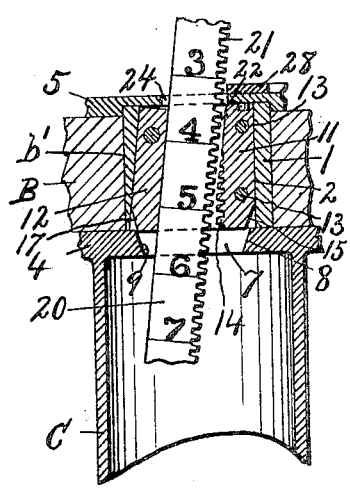
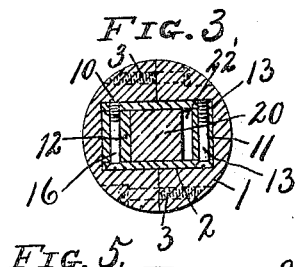
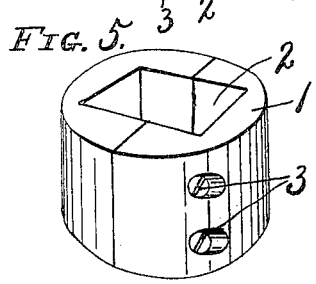
WITNESSES
A. D. Allen
B. E. Robinson
INVENTOR
Clarence H Vader
BY
Howard P. Denison
ATTORNEY

UNITED STATES PATENT OFFICE.

CLARENCE H. VADER, OF SYRACUSE, NEW YORK.

ADJUSTABLE CHAIR-SEAT.

No. 807,701.  Specification of Letters Patent.  Patented Dec. 19, 1905.

Application filed April 10, 1905. Serial No. 254,819.

*To all whom it may concern:*

Be it known that I, CLARENCE H. VADER, of Syracuse, in the county of Onondaga, in the State of New York, have invented new and useful Improvements in Adjustable Chair-Seats, of which the following, taken in connection with the accompanying drawings, is a full, clear, and exact description.

This invention relates to improvements in adjustable chair-seats, and is particularly useful in connection with school-seats, revolving office-chairs, and piano-stools as a substitute for the ordinary screw which operates in any suitable nut in the base of the chair. It is well known that this screw adjustment as applied to adjustable chair-seats is particularly slow and laborious, owing to the necessity for a comparatively light pitch to the screw-threads to prevent the rotation and depression of the seat by its own weight or by the weight of the occupant, and that when the seat is adjusted to the desired height and used by the same person for a greater or less period of time certain intermeshing threads of the screw and nut become worn to such an extent as to allow the seat to vibrate laterally with considerable lost motion, and that after a time the screw works exceedingly hard or extremely loose in different positions, thereby necessitating replacement of the old screw and nut by new ones. Furthermore, a screw is not believed to be practicable on a school-seat, owing to the indiscreet use to which it would be subjected by the students.

My object, therefore, is to provide means whereby any revoluble or non-revoluble seat may be quickly and easily adjusted to the desired height and automatically locked in its adjusted position by its own weight, such locking being rendered more positive by the weight of the occupant.

Another object is to avoid the use of springs, spring-pawls, and other similarly-tempered elements, which are always more or less unreliable, and therefore unsafe.

When my device is used in connection with school-seats which are adapted to be adjusted to various heights according to the grades or different heights of the students in different rooms, it is desirable to permanently lock the seats in their adjusted position against malicious or indiscreet interference with such adjustment; and a further object of my invention is to provide a simple and effective means for accomplishing this result.

Other objects and uses relating to the specific elements of my invention will be brought out in the following description.

In the drawings, Figure 1 is a vertical sectional view of my invention as applied to a piano-stool and its supporting-base, showing the parts in their normal operative position. Fig. 2 is a similar sectional view of a portion of the device seen in Fig. 1, showing the manner of effecting the adjustment of the seat. Fig. 3 is a transverse horizontal sectional view taken on line 3 3, Fig. 1. Fig. 4 is a perspective view of the clamping-jaws and their supporting-plates. Fig. 5 is a perspective view of the sleeve or collar for receiving said jaws and plates.

In demonstrating the practicability of my invention I have shown a piano-stool comprising a seat A and suitable base B, having suitable supporting-legs $b$ and a central tubular standard C, all of which parts may be of any desired construction adapted to receive the various parts of my invention.

The base B is provided with a central circular opening $b'$, in which is fitted a circular bushing 1, having a central opening 2, extending from top to bottom of the bushing and of rectangular cross-section, one of the upright sides of the opening 2 being beveled or undercut vertically for a purpose presently described. This bushing 1 is preferably split through its longitudinal center, forming opposed sections for the purpose of facilitating the work of milling the grooves in the meeting faces of the half-sections which form the opening 2, said half-sections being afterward secured together by suitable fastening means, as clamping-screws 3. This bushing 1 is fitted in the opening $b'$ and is held in place by lower and upper metal plates 4 and 5, which are clamped to the opposite faces of the base B by suitable clamping means, as bolts 6, said plates engaging, respectively, the lower and upper end faces of the bushing 1 and operating to hold it in place. The lower plate 4 is formed with a central rectangular opening 7, having opposite beveled edges 8 and 9, which are spaced apart a less distance than the corresponding width in the opening 2 in the bushing 1.

Movable in the opening 2 is a rectangular frame 10 of substantially the same cross-sectional form and size as the upper end of the opening 2, and in this frame is mounted a fixed jaw 11 and a movable jaw 12, the jaw 11 being secured to the frame by suitable screws 13, and its lower end is provided with one or more gear-teeth 14 and an opposed beveled edge 15, while the opposite movable jaw 12 is pivoted at 16 and is provided with an inner substantially plane face and a beveled outer edge 17 at its lower end, said beveled edge being opposed to the beveled surface 15 of the jaw 11. This frame 10, carrying the fixed and movable jaws 11 and 12, has a slight vertical movement in the opening 2, and when in its normal operating position the beveled faces 15 and 17 of the jaws 11 and 12 are seated, respectively, against the beveled faces 8 and 9 of the plate 4, which operate to force the movable jaw toward the fixed jaw. These jaws 11 and 12 are spaced apart a sufficient distance to receive a rectangular shank 20, having a toothed rack 21, which engages or intermeshes with the teeth 14 of the fixed jaw 11. It therefore appears that the frame 1 is provided with a vertical opening 22 and that the shank 20, with its toothed rack 21, is movable vertically in said opening 22, and in order to permit of this adjustment the movable jaw 12 is hinged near its upper end and the opposite face of the fixed jaw is beveled upwardly from the teeth 14, so that the top of the opening 22 is somewhat larger than the bottom of said opening when the jaws are closed against the shank 20, and for the same purpose the lower end of the opening 2 in the bushing 1 is of greater width in the direction of movement of the movable jaw 12 than its upper end to allow said jaw to swing outwardly when the frame 10 is elevated to unseat the beveled edges 15 and 17 from the corresponding seats 8 and 9.

The shank 20 extends some distance below the sliding frame or head 10 and also extends upwardly through the opening 24 in the plate 5 and receives at its upper end the seat A.

When it is desired to adjust the seat vertically, the operator first lifts the seat, thereby drawing the shank and frame 10 upwardly, owing to the fact that the teeth 14 are interlocked with the teeth of the rack 21, this upward movement being continued until the beveled faces 15 and 17 of the jaws 11 and 12 are drawn out of engagement with their respective seats 8 and 9, whereupon the seat and its shank 20 are tilted in the direction of the toothed rack 21, thereby forcing the teeth of said rack 21 out of engagement with the teeth 14 of the fixed jaw 11 and at the same time rocking the movable jaw 12 upon its pivot 16, as best seen in Fig. 2, it being understood that the openings 7 and 24 are of sufficient width to permit this tilting movement of the shank. After the intermeshing teeth of the rack 21 and jaw 14 have been disengaged from each other it is apparent that the shank may be moved endwise in the opening 22 to any desired position and that when the seat is brought to the desired height it is brought to its normal position, so that the shank is disposed vertically, thereby reëngaging the teeth of the rack 21 with those of the fixed jaw 15, thereby locking the shank to the sliding head 10 and at the same time rocking the movable jaw 12 toward the fixed jaw 15, so that by releasing the seat its own gravity or the weight of the occupant upon the seat will cause the beveled edges 15 and 17 to ride upon the beveled faces 8 and 9 of the fixed plate 4 and cause both jaws to firmly engage the opposite faces of the shank and hold it against further downward movement. This plate 4 is preferably provided with a tubular extension C, which surrounds and conceals the lower depending end of the shank 20 and is adapted to be inserted into a central supporting-standard. (Not shown.)

The lower end of the shank 20 is provided with a suitable stop-shoulder or abutment 26, which is held in place by a screw 27, so that it may be removed when desired, but normally serves to prevent the upward displacement of the shank 20 from engagement with the jaws 11 and 12.

It is sometimes desirable to permanently lock the shank 20, or rather the toothed rack 21, in its adjusted position for maintaining operative connection with the fixed and movable jaws 11 and 12, and for this purpose I provide the top plate 5 with an adjustable abutment 28, which in this instance consists of a metal plate having an elongated slot 28', through which is passed a screw 29 to secure said plate to the plate 5. It is now apparent that this abutment 28 may be adjusted toward and from the toothed rack 21, and when it is desired to permanently lock the seat in its adjusted position this abutment is moved forwardly into engagement with the teeth of the rack 21 and then firmly clamped by the screw 29, which prevents the lateral tilting of the shank, and therefore prevents the disengagement of the teeth of the rack from the teeth 14 of the fixed jaw 15, thereby permanently locking the frame 10 to the shank 20.

The upper end of the shank 20 is provided with a fixed collar 30 and a cylindrical bearing 31, projecting upwardly from the collar and upon which is journaled a flanged sleeve 32 for receiving and supporting the seat A, which is preferably formed with the recess $a$ in its lower face to receive a nut 33 on the threaded extremity 34 of the spindle 31, said nut operating to hold the sleeve 32 and seat A in operative position upon the spindle 31.

In order to relieve the end thrust and reduce the friction of the sleeve 32 upon its bearing 31, I provide a ball-retainer ring 34' with suitable antifriction-balls 35, which are interposed between the collar 30 and a hardened bearing-ring 36 adjacent to the lower end face of the sleeve 32.

It will be observed that the rectangular frame 10 has a sliding fit in a similar rectangular opening 2 in the bushing 1 and that this bushing is fitted tightly in the opening $b'$ of the base B and is firmly held against rotary movement by and between the plates 4 and 5, and it is therefore clear that when the shank 20 is inserted in the opening 22 of the frame 10 these parts are held from rotary movement, but are capable of longitudinal movement, the frame 10 sliding a limited distance in the opening 2, while the shank 20 may be adjusted endwise in the opening 22 by simply lifting the seat a sufficient distance to disengage the beveled faces 15 and 17 from their respective seats 8 and 9. As soon as the shank 20 is again brought to a vertical position the teeth of the rack 21 are caused to intermesh with the teeth 14 of the pawl 11, and the mere gravity of the seat independently or together with a superimposed weight upon the seat causes the rack 21 to force the frame 10 downwardly, so that the beveled edges 15 and 17 of the pawls 11 and 12 are wedged between the beveled faces 8 and 9 and impinge against opposite faces of the shank 20, during which operation it is clear that the heavier the load upon the seat the tighter the jaws grip upon the shank. Although the shank is positively locked from rotary or vertical movement, the seat is free to revolve upon the spindle 31 at the upper end of the shank, thereby producing a revolving chair, and at the same time the sliding head 10 and its jaws 11 and 12 permit the seat to be adjusted vertically within the range of the length of the shank 20, or rather of the toothed rack 21.

Having thus described my invention, what I claim, and desire to secure by Letters Patent, is—

1. An adjustable chair-seat having a depending shank, and a toothed rack on one of the vertical faces of the shank, a toothed jaw engaging the toothed rack, and a second jaw engaging the opposite face of the shank, said jaws being movable vertically a limited distance and the shank being tiltable laterally between the jaws to disengage the teeth of the rack from the toothed jaw and means operating to engage and force the movable jaw toward the fixed jaw when both jaws are moved downwardly.

2. In a chair of the class described, the combination with a base and seat, of two jaws slidable a limited distance vertically within the base and means to force the jaws toward each other when they are moved downwardly, a shank on the seat slidable between said jaws, a toothed rack on the shank and a tooth on one of the jaws intermeshing with the teeth of the rack, said shank being slidable laterally to disengage the teeth of the rack from the toothed jaw, whereby the shank and seat may be adjusted independently of the jaws.

3. In a chair of the class described, the combination with a base and seat, of a slidable head in the base, a fixed jaw and a movable jaw both mounted on said head, the fixed jaw being provided with a tooth, a shank on the seat movable endwise between the jaws, a rack on the shank engaging the teeth of the fixed jaw, said shank being tiltable laterally to disengage the teeth of the rack from the toothed jaw to allow said shank to be adjusted endwise irrespective of the jaws and means for forcing said jaws against opposite faces of the shank when the seat is depressed.

In witness whereof I have hereunto set my hand this 4th day of April, 1905.

CLARENCE H. VADER.

Witnesses:
H. E. Chase,
Mildred M. Nott.